United States Patent
Grasreiner

(10) Patent No.: US 11,384,676 B2
(45) Date of Patent: Jul. 12, 2022

(54) METHOD FOR MONITORING SENSOR SIGNALS AND QUANTITATIVE DETERMINING OF THE STOICHIOMETRIC FUEL-AIR RATIO OF THE TYPE OF FUEL USED BY MEANS OF AN INJECTOR TEST AND CATALYST DIAGNOSIS IN A VEHICLE

(71) Applicant: Bayerische Motoren Werke Aktiengesellschaft, Munich (DE)

(72) Inventor: Sebastian Grasreiner, Graefelfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/297,334

(22) PCT Filed: Dec. 9, 2019

(86) PCT No.: PCT/EP2019/084251
§ 371 (c)(1),
(2) Date: May 26, 2021

(87) PCT Pub. No.: WO2020/143968
PCT Pub. Date: Jul. 16, 2020

(65) Prior Publication Data
US 2021/0355854 A1    Nov. 18, 2021

(30) Foreign Application Priority Data
Jan. 11, 2019    (DE) .................... 10 2019 100 577.9

(51) Int. Cl.
*F01N 11/00*    (2006.01)
*F01N 3/28*    (2006.01)
*F02D 41/02*    (2006.01)

(52) U.S. Cl.
CPC .............. *F01N 11/007* (2013.01); *F01N 3/28* (2013.01); *F02D 41/0235* (2013.01); *F01N 2550/02* (2013.01)

(58) Field of Classification Search
CPC ...... F01N 11/007; F01N 3/28; F01N 2550/02; F02D 41/0235
See application file for complete search history.

(56) References Cited

U.S. PATENT DOCUMENTS 9,650,981 B1 *   5/2017   Large ................. F02M 35/1038
11,105,291 B1 *  8/2021   Van Nieuwstadt .........................
                                                      F02D 41/0007

(Continued)

FOREIGN PATENT DOCUMENTS

DE       102 60 721 A1    7/2004
DE       103 31 334 A1    2/2005

(Continued)

OTHER PUBLICATIONS

English translation of document (German-language Office Action filed on May 26, 2021) issued in German Application No. 10 2019 100 577.9 dated Aug. 22, 2019 (five (5) pages).

(Continued)

*Primary Examiner* — Matthew T Largi
(74) *Attorney, Agent, or Firm* — Crowell & Moring LLP

(57) ABSTRACT

A method for the onboard diagnosis in a vehicle having a catalytic convertor and a lambda-controlled internal combustion engine in the running operation of the vehicle, includes determining the currently maximum possible oxygen storage capacity of the catalytic convertor as well as a measured temporal duration between the lean spike of the pre-catalyst lambda probe and the post-catalyst lambda probe takes place by means of an OSC diagnosis. The (Continued)

method also includes determining a theoretical residual oxygen content and determining a theoretical temporal duration. When the quotient between the measured temporal duration ($\Delta t$) and the theoretical temporal duration ($\Delta t_{theo}$) lies within a predefined range delimited by a first and a second threshold value (SW1; SW2), thus:

$$SW1 \leq \frac{\Delta t}{\Delta t_{theo}} \leq SW2,$$

it is determined that the pre-catalyst lambda probe and the post-catalyst lambda probe operate without flaw.

6 Claims, 1 Drawing Sheet

(56) References Cited

U.S. PATENT DOCUMENTS

| | | |
|---|---|---|
| 2002/0120386 A1 | 8/2002 | Shi et al. |
| 2003/0097873 A1 | 5/2003 | Surnilla |
| 2003/0221415 A1 | 12/2003 | Roesel et al. |
| 2006/0170538 A1 | 8/2006 | Schnaibel et al. |
| 2016/0032812 A1* | 2/2016 | Lee ............... F02D 41/1494 73/114.73 |
| 2017/0152826 A1* | 6/2017 | Claude ............ F02D 41/1456 |
| 2017/0184044 A1 | 6/2017 | Grasreiner |
| 2018/0142601 A1* | 5/2018 | Kumar ............... F01N 11/007 |
| 2020/0271039 A1* | 8/2020 | Kidd ................. F01N 11/007 |

FOREIGN PATENT DOCUMENTS

| | | |
|---|---|---|
| DE | 10 2005 038 492 A1 | 2/2007 |
| DE | 10 2014 218 430 A1 | 3/2016 |
| JP | 2008-31901 A | 2/2008 |
| WO | WO 2018/106771 A1 | 6/2018 |
| WO | WO-2018106771 A1 * | 6/2018 ......... F02D 41/1495 |

OTHER PUBLICATIONS

International Search Report (PCT/ISA/210) issued in PCT Application No. PCT/EP2019/084251 dated Mar. 20, 2020 with English translation (six (6) pages).

German-language Written Opinion (PCT/ISA/237) issued in PCT Application No. PCT/EP2019/084251 dated Mar. 20, 2020 (seven (7) pages).

German-language Office Action issued in German Application No. 10 2019 100 577.9 dated Aug. 22, 2019 (five (5) pages).

German-language Decision to Grant issued in German Application No. 10 2019 100 577.9 dated Sep. 11, 2019 with English translation (10 pages).

* cited by examiner

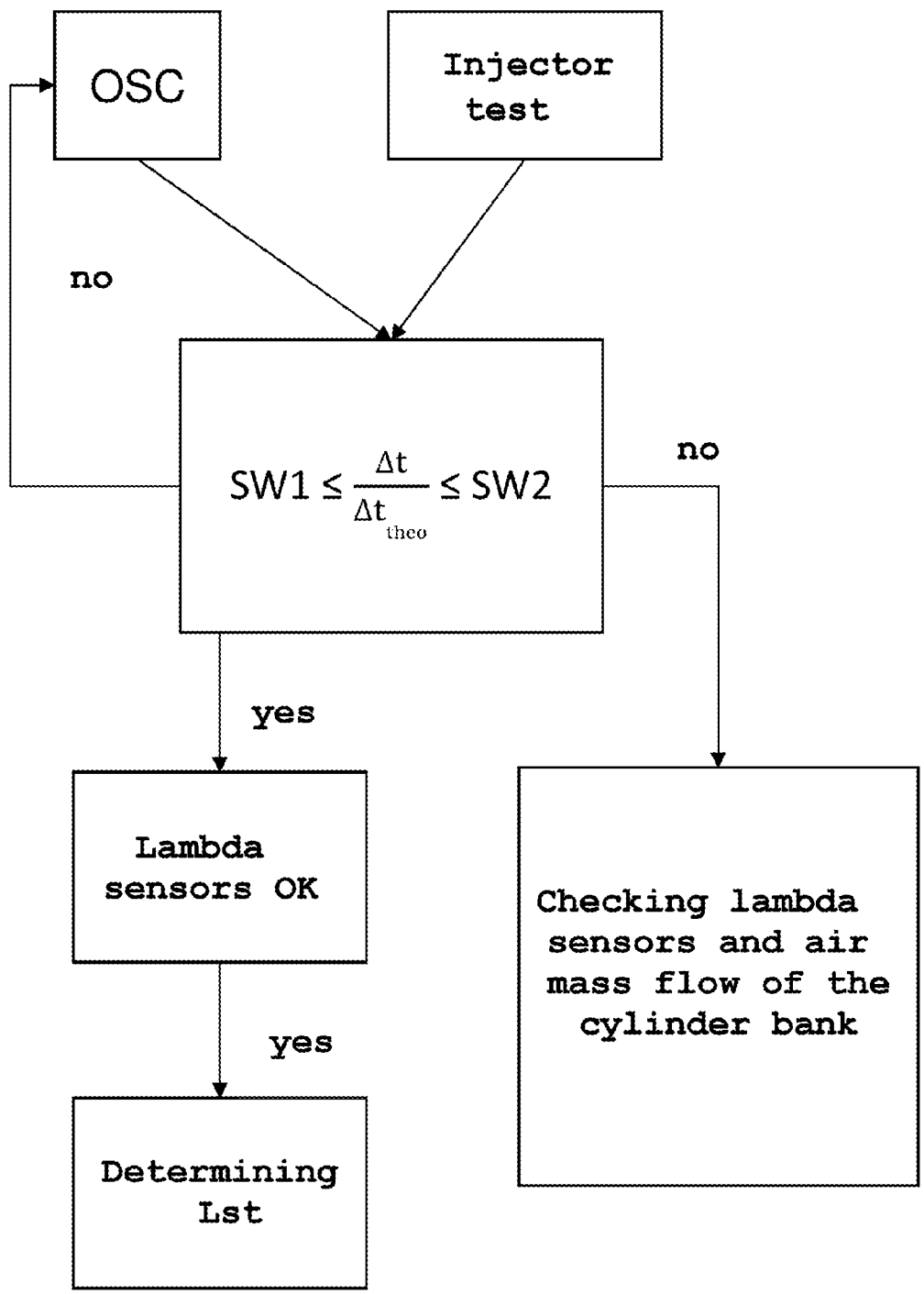

METHOD FOR MONITORING SENSOR SIGNALS AND QUANTITATIVE DETERMINING OF THE STOICHIOMETRIC FUEL-AIR RATIO OF THE TYPE OF FUEL USED BY MEANS OF AN INJECTOR TEST AND CATALYST DIAGNOSIS IN A VEHICLE

BACKGROUND

This disclosure relates to a method for monitoring sensor signals and quantitively determining the stoichiometric fuel-air ratio of the type of fuel used by means of an injector test and catalyst diagnosis in a vehicle.

Current four-stroke gasoline engine concepts can develop their potential in terms of output, consumption, dynamics, or else emissions, only by way of intact system components. Even small defects prevent clean running of the engine in an enduring manner. Onboard diagnostic functions which run on the control unit during the operation of the vehicle are therefore required for diagnosing the components in the various operating ranges of the latter. Some of these diagnostic functions are already prescribed by law. For example, an onboard diagnostic function for catalyst diagnosis, the so-called OSC diagnosis, is already known. In the OSC diagnosis, the oxygen storage capacity (OSC), thus the capability of converting harmful exhaust gases, is determined. Injector tests for servicing, for example in a specialist workshop, in which a mixture mass assessment is carried out by means of a lambda probe, for example, are also already known. A method for an improved injector test in vehicles is known from DE 10 2014 218 430 A1. Injection nozzle defects with an indication pertaining to the type of defect can be determined herein. This method is however not carried out as an online diagnosis but rather during idling of the vehicle under predefined conditions.

Moreover, active diagnosis such as during servicing, for example actuating actuators and feedback measuring of the sensor signals, during the operation of the vehicle can disturb or irritate the driver. Moreover, active diagnosis while servicing are limited to a few operating points at low load and revolutions such that only a small range of the operation of the vehicle can be represented and malfunctions of the high-pressure injection system that are a function of the operating point potentially cannot be detected.

SUMMARY

It is therefore an object of this disclosure to provide a method for the online diagnosis of injectors so as to provide a plausibility check of sensor signals as well as a calculation of fuel-specific key indicators. This and other objects are achieved by the inventive method for the onboard diagnosis in a vehicle having a catalytic converter and a lambda-controlled internal combustion engine in the running operation of the vehicle, wherein at least one pre-catalyst lambda probe is disposed upstream of the catalytic converter and one post-catalyst lambda probe is disposed downstream of the catalytic converter. Both lambda probes emit corresponding sensor signals, wherein a plausibility check of the sensor signals takes place in that determining the currently maximum possible oxygen storage capacity of the catalytic converter as well as a measured temporal duration between the lean spike of the pre-catalyst lambda probe and the post-catalyst lambda probe takes place by means of an OSC diagnosis, and a theoretical residual oxygen content is determined by means of an injector test. A theoretical temporal duration between the lean spike of the pre-catalyst lambda probe and the post-catalyst lambda probe is determined as follows from the current oxygen storage and the theoretical residual oxygen content: $\Delta t_{theo}=OSC/\dot{m}_{RO2}$. When the quotient between a measured temporal duration and a theoretical temporal duration lies between a predefined range delimited by a first and a second threshold value, thus: $SW1 \leq \Delta t/\Delta t_{theo} \leq SW2$ it is determined that the pre-catalyst lambda probe and the post-catalyst lambda probe operate flawlessly, that is to say that no external intervention is required.

The method is used for fuel-injected engines, in particular in the automotive sector. On account of the proposed method, a preventive diagnosis and a plausibility check of sensor signals can take place in the running operation of the vehicle without being substantially perceived by the driver.

Further features and advantages of the disclosure are derived from the description hereunder of exemplary embodiments of the invention, by means of the figures of the drawing which shows details according to the invention, and from the claims. The individual features can in each case be implemented individually or so as to be arbitrarily combined in a variant of the invention.

Other objects, advantages and novel features of the present invention will become apparent from the following detailed description of one or more preferred embodiments when considered in conjunction with the accompanying drawings, in which:

BRIEF DESCRIPTION OF THE DRAWING

FIG. 1 is a flow chart which visualizes an embodiment of the method according to this disclosure for carrying out the monitoring of sensor signals and for quantitively determining the stoichiometric fuel-air ratio of the type of fuel used by means of an injector test and a catalyst diagnosis in a vehicle.

DETAILED DESCRIPTION OF THE DRAWING

An injector test which can already identify minor damage to injectors is proposed in DE 10 2014 218 430 A1 already mentioned above. However, this method is provided for servicing, thus not for an online or onboard diagnosis OBD, thus a diagnosis in the running operation of the vehicle.

In the proposed injector test, a number of successive test steps are carried out for a respective bank of cylinders in the idling operation of the internal combustion engine, said number of successive test steps being greater than the number of cylinders of the respective cylinder bank, wherein in a respective test step fuel mixture factors which establish in each case the fuel mass flow through the individual injector nozzles when the latter are actuated are set for the individual injector nozzles. One or a plurality of fuel mixture factors are varied from one test step to the next for at least some successive test steps. Measurements of the lambda value of the exhaust gas flow discharged from the cylinder bank and measurements of the air mass flow supplied to the cylinder bank are carried out during the test steps. After the number of test steps have been carried out, a standard deviation value for each injection nozzle as well as a total leakage flow are determined, wherein the standard deviation value for a respective injection nozzle describes a deviation of the fuel mass flow generated by the respective injection nozzle from a standard operating value of the respective injection nozzle, and the total leakage flow describes the fuel mass flow which is caused by leakages of all injection nozzles of the respective cylinder bank. The determining of the standard deviation values for the respective injection nozzles and of the total leakage flow takes place in such a manner that a system of equations is solved in a computer-supported manner, said system of equations for a respective test step comprising an equation which describes the standard deviation values and the total leakage flow as a function of the fuel mixture factors set in the respective test step, describes a lambda value which applies to the respective test step and is derived from the measurements of the lambda value, and an air mass flow which applies to the respective test step and is derived from the measurements of the air mass flow. In the event that at least one standard deviation value for a respective injection nozzle lies outside a predetermined value range, a first injection nozzle defect in the respective cylinder bank is detected in the form of a deviation in terms of the injected quantity of fuel of at least one injection nozzle. In the event that the total leakage flow is greater than a predetermined threshold value, a second injection nozzle defect in the respective cylinder bank is detected in the form of a leakage of at least one injection nozzle.

Because variations in the fuel mixture are measured in the OSC diagnosis, coupling the implementation of trimming steps of the injected test to the OSC diagnosis takes place according to this disclosure, the fundamental principle thereof being briefly explained hereunder. The OSC diagnosis is carried out in the driving operation of the vehicle and utilizes the targeted trimming of the quantities of injected fuel gv (=mixture trimming), thus a variation of the fuel masses $\dot{m}_K$ per cylinder in order to provoke the rich/lean leaps in the exhaust gas. The rich/lean leaps mentioned vary the composition of the exhaust gas and thus the residual oxygen content that can be measured by the lambda probe. This variation can be picked up and evaluated with the aid of lambda probes, wherein the pre-catalyst lambda probe first measures variation in the fuel mixture, the exhaust gas then flowing through the catalytic converter and downstream reaching the post-catalyst lambda probe. The time between the measured variations in the fuel mixture in the case of a defined lean leap is utilized for indicating a dead time between the pre-catalyst and the post-catalyst lambda probe. The dead time correlates with the capability of the catalytic converter to store oxygen molecules (OSC) and to provide the latter for the conversion of exhaust gas. The result of the OSC diagnosis in the event of an error can be triggered in the error memory and error display.

In order for the two methods to be combined with one another such that the diagnosis in the running operation of the vehicle takes place so as to be ideally imperceptible by the driver, parameters RB which have to be met in order for the injector test to be started during the running operation of the vehicle are predefined. Such parameters RB may be a continuous driving task, idling, or a stoppage of the vehicle, that is to say that the vehicle is in a specific driving mode for a predetermined period, for example steady travel without intense acceleration or intense deceleration. This can be determined or predicted by systems present in the vehicle, depending on the specification of the vehicle. An evaluation can thus take place directly in the vehicle and irregularities, for example implausible states, can be identified in a timely manner prior to a component failure.

According to the disclosure, the OSC diagnosis and the injected test are conjointly carried out during the running operation of the vehicle, wherein a simultaneous utilization of identical trimmings of the fuel mixture of the cylinder takes place. The OSC diagnosis herein determines a temporal duration $\Delta t$ until a lean spike of the oxygen from $\lambda_{vorKat}$ can also be seen in $\lambda_{nachKat}$, this being measured by the two lambda probes upstream and downstream of the catalytic converter, starting in the state without load. The OSC diagnosis herein also determines a measured oxygen storage capability OSC. The injector test for the present disclosure determines the theoretical residual oxygen content $\dot{m}_{RO2}$ as a function of the quality of the mixture, assuming that $\lambda_{Verbrennung}=\lambda_{vorKat}$, as well as the air mass flow mshfm. The theoretical residual $\dot{m}_{RO2}$ oxygen content is a function of the chemical conversion quality and can be derived from table books for the oxidation of hydrocarbons.

For the plausibility check of the sensor signals according to the disclosure, variables from the injector test described further above and in DE 10 2014 218 430 A1 and from the OSC diagnosis are compared. The number of cylinders Anz and the so-called cylinder balancing factor cb, the latter being a percentage adaptation factor of the fuel flow, are known herein.

The following variables from the injector test are used:
Input variables (measured or calculated in the control unit or the control installation, respectively):
  $gv_i$ set mixture factors per test step i;
  $\lambda_{vor}$, lambda value prior to the catalytic convertor;
  mshfm an air mass flow supplied to a cylinder bank, for example measured by a hot-film air mass meter, also referred to as $\dot{m}_L$;
  $\lambda_{soll}$ desired lambda value of the fuel combustion in the combustion chamber, known from the operating strategy of the control unit;
  $L_{st}$ stoichiometric air-fuel ratio.
Calculated Output Variables:
  $o_i$ standard deviation value for a respective injection nozzle;
  $L_{o,sum}$ total leakage flow of all injection nozzles of the tested cylinder bank.

From the injector test the following correlation becomes evident according to the formula hereunder:

$$\sum (gv_i \cdot cb_i \cdot o_i) + \frac{L_{st} \cdot \lambda_{soll} \cdot Anz}{mshfm} \cdot L_{o,sum} = \frac{Anz}{\lambda_{vor}}$$

The injector error $o_i$ can in particular be determined from this correlation.

The following variables from the OSC diagnosis are used:
Input variables (measured or calculated in the control unit or the control installation, respectively):
  $gv_i$ set mixture factors per test step;
  $\lambda_{vor}$ lambda value prior to the catalytic convertor;
  $\lambda_{nach}$ lambda value after the catalytic converter.
Output Values (Calculated):
  $\Delta t$ time (duration) between the lean spike from $\lambda_{vor}$ to $\lambda_{Nach}$;
  OSC measured oxygen storage capability.

A theoretical value $\Delta t_{theo}$ can be determined with the aid of the theoretical residual oxygen $\dot{m}_{RO2}$ content from the injected test and the measured OSC value from the OSC diagnosis: $\Delta t_{theo}=OSC/\dot{m}_{RO2}$.

A mutual plausibility check of the measured variables is enabled from the comparison of $\Delta t$ measured in the OSC diagnosis and calculated $\Delta t_{theo}$.

This means that when measured $\Delta t$ and theoretical $\Delta t_{theo}$ lie within predefined threshold values SW1 and SW2, the sensors can be evaluated as being functional or not defective:

$$SW1 \le \frac{\Delta t}{\Delta t_{theo}} \le SW2.$$

No intervention such as a replacement of components is thus required.

Advantageously, $$\frac{\Delta t}{\Delta t_{theo}}$$

should be 1±0.03 to 0.05, that is to say that SW1 should be between 0.95 and 0.97 (inclusive) and SW2 between 1.03 and 1.05 (inclusive).

When the quotient is not within the predefined threshold values it has to be checked, for example, whether $\lambda_{Verbrennung} \ne \lambda_{vorKat}$, that is to say that one or both of the lambda probes is/are damaged. The sensor may be damaged when the air mass flow mshfm is inaccurately measured.

Moreover, in the event that the sensor signals are considered to be flawless, thus the lambda sensors and the air mass value are OK in FIG. 1, determining, more specifically quantitatively determining, fuel-specific key indicators can take place.

From measured Δt and OSC values, the theoretical air oxygen content=f(mshfm, $\lambda_{Verbrennung}$) where $\lambda_{Verbrennung} \approx \lambda_{vorKat}$ can be determined by way of the correlation $\dot{m}_{RO2}$=OSC/Δt.

Determining $\lambda_{Verbrennung}$ from $\dot{m}_{RO2}$ and mshfm airmass can take place from the injector test:
$\lambda_{Verbrennung}$=mshfm/($L_{st}$*$\dot{m}_K$), wherein the fuel mass $\dot{m}_K$ is determined as follows:
$\dot{m}_K$=f(injection parameters from the control unit or control installation, respectively).

Here, $\dot{m}_K$ is the actual fuel mass flow caused by leakages and the utilized mass of all injection nozzles of the respective cylinder bank. This actual fuel mass flow can be calculated during the injector test.

The stoichiometric fuel-air ratio can in turn be calculated therefrom:

$$L_{st} = \frac{\frac{OSC}{\Delta t}}{\lambda_{vorKat} \cdot \dot{m}_k}$$

The stoichiometric fuel-air ratio $L_{st}$ can thus be quantitatively determined by way of existing or known correlations, or from correlations determined by specific diagnostic methods or tests. This is important and required for the preliminary controlling of the mixture fed into the injector.

What is claimed is:

1. A method for the onboard diagnosis in a vehicle having a catalytic convertor and a lambda-controlled internal combustion engine in the running operation of the vehicle, comprising:
    disposing at least one pre-catalyst lambda probe upstream of the catalytic convertor;
    disposing one post-catalyst lambda probe downstream of the catalytic convertor, wherein both lambda probes emit corresponding sensor signals; and
    checking a plausibility of the sensor signals by:
        determining the currently maximum possible oxygen storage capacity of the catalytic convertor as well as a measured temporal duration between a lean spike of the at least one pre-catalyst lambda probe and the post-catalyst lambda probe by means of an OSC diagnosis;
        determining a theoretical residual oxygen content in the exhaust gas via an injector test; and
        determining a theoretical temporal duration between the lean spike of the at least one pre-catalyst lambda probe and the post-catalyst lambda probe from a current oxygen storage capacity and the theoretical residual oxygen content, wherein
            when a quotient between the measured temporal duration (Δt) and the theoretical temporal duration ($\Delta t_{theo}$) lies within a predefined range delimited by a first and second threshold value (SW1; SW2), thus:

$$SW1 \le \frac{\Delta t}{\Delta t_{theo}} \le SW2,$$

it is determined that the at least one pre-catalyst lambda probe and the post-catalyst lambda probe operate without flaw, wherein
the first threshold value (SW1) lies within a range from 0.95 to 0.97, and the second threshold value (SW2) lies within a range from 1.03 to 1.05.

2. The method according to claim 1, wherein when it has been determined that the at least one pre-catalyst lambda probe and the post-catalyst lambda probe operate without flaw, quantitative determining of a stoichiometric fuel-air ratio ($L_{st}$) takes place as follows:

$$L_{st} = \frac{\frac{OSC}{\Delta t}}{\lambda_{vorKat} \cdot \dot{m}_k}$$

where:
OSC is measured oxygen storage capacity of the catalytic convertor;
Δt is temporal duration until a lean spike of oxygen of $\lambda_{vorKat}$ is also visible in $\lambda_{nachKat}$
$\lambda_{vorKat}$ is a lambda value of the at least one pre-catalyst lambda probe; and
$\dot{m}_K$ is fuel mass flow from a pre-controlling or controlling action, respectively, of a control unit.

3. The method according to claim 2, wherein the onboard diagnosis is carried out only when predefined parameters are met.

4. The method according to claim 3, wherein the predefined parameters comprise at least one of a continuous driving task, idling or a stoppage of the vehicle.

5. An apparatus for onboard diagnosis in a vehicle having a catalytic converter and a lambda-controlled internal combustion engine in a running operation of the vehicle, wherein at least one pre-catalyst lambda probe is disposed upstream of the catalytic converter and one post-catalyst lambda probe is disposed downstream of the catalytic converter, wherein both the at least one pre-catalyst lambda probe and the one post-catalyst lambda probe emit corresponding sensor signals ($\lambda_{vor}$, $\lambda_{nach}$), the apparatus comprising:

a control unit configured to perform a plausibility check of each sensor signal ($\lambda_{vor}$, $\lambda_{nach}$), the control unit being configured to:

determine a currently maximum possible oxygen storage capacity (OSC) of the catalytic converter as well as a measured temporal duration ($\Delta t$) between a lean spike of the at least one pre-catalyst lambda probe ($\lambda_{vor}$) and the post-catalyst lambda probe ($\lambda_{nach}$) by means of an OSC diagnosis, wherein a theoretical residual oxygen content ($\dot{m}_{RO2}$) in the exhaust gas is determined by means of an injector test, a theoretical temporal duration ($\Delta tt_{heo}$) between the lean spike of the at least one pre-catalyst lambda probe and the post-catalyst lambda probe is determined as follows from a current oxygen storage capacity (OSC) and the theoretical residual oxygen content ($\dot{m}_{RO2}$): $\Delta t_{theo} = OSC/(\dot{m}_{RO2})$, and when a quotient between the measured temporal duration ($\Delta t$) and the theoretical temporal duration ($\Delta t theo$) lies within a predefined range delimited by a first and a second threshold value (SW1; SW2), thus $$SW1 \leq \frac{\Delta t}{\Delta t_{theo}} \leq SW2,$$

it is determined that the at least one pre-catalyst lambda probe and the post-catalyst lambda probe operate without flaw, wherein the first threshold value (SW1) lies within a range from 0.95 to 0.97, and the second threshold value (SW2) lies within a range from 1.03 to 1.05.

6. A vehicle having an internal combustion engine, the catalytic converter having the at least one pre-catalyst lambda probe and the post-catalyst lambda probe, as well as injection nozzles for feeding fuel into combustion chambers of the internal combustion engine, wherein the vehicle has the apparatus according to claim 5.

* * * * *